United States Patent
Abkowitz et al.

(10) Patent No.: US 6,993,575 B2
(45) Date of Patent: Jan. 31, 2006

(54) USING ONE DEVICE TO CONFIGURE AND EMULATE WEB SITE CONTENT TO BE DISPLAYED ON ANOTHER DEVICE

(75) Inventors: David Abkowitz, Mountain View, CA (US); Jeremy Chone, San Francisco, CA (US); Jacob Christfort, San Francisco, CA (US); Lawrence J. Ellison, Atherton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 975 days.

(21) Appl. No.: 09/773,982

(22) Filed: Jan. 31, 2001

(65) Prior Publication Data

US 2001/0041973 A1    Nov. 15, 2001

Related U.S. Application Data

(60) Provisional application No. 60/184,211, filed on Feb. 22, 2000.

(51) Int. Cl.
*G06F 15/177* (2006.01)

(52) U.S. Cl. ............... 709/220; 709/246; 715/778
(58) Field of Classification Search ........... 709/246, 709/245, 220–222, 227–228; 345/581, 619, 345/1.1–3.4; 715/527, 523, 778; 358/1.15; 703/23; 455/419, 556.1
See application file for complete search history.

(56) References Cited

U.S. PATENT DOCUMENTS

| | | | | |
|---|---|---|---|---|
| 6,078,936 A | * | 6/2000 | Martin et al. ............... 715/527 |
| 6,390,371 B1 | * | 5/2002 | Armga et al. ........... 235/472.01 |
| 6,430,624 B1 | * | 8/2002 | Jamtgaard et al. .......... 709/246 |
| 6,457,060 B1 | * | 9/2002 | Martin et al. ............... 709/245 |
| 6,490,627 B1 | * | 12/2002 | Kalra et al. ................. 709/231 |
| 6,564,250 B1 | * | 5/2003 | Nguyen ...................... 709/208 |
| 6,614,432 B1 | * | 9/2003 | Merrill ....................... 345/428 |
| 6,615,212 B1 | * | 9/2003 | Dutta et al. .................. 707/10 |
| 6,650,893 B1 | * | 11/2003 | Lipsit ......................... 455/419 |
| 6,684,257 B1 | * | 1/2004 | Camut et al. ............... 709/246 |
| 6,704,024 B2 | * | 3/2004 | Robotham et al. .......... 345/581 |
| 6,704,797 B1 | * | 3/2004 | Fields et al. ................ 709/246 |

OTHER PUBLICATIONS

Greg Hewgill, "Copilot User's Manual," Jun. 10, 1997, Version 1.0 beta 9, XP-002216883, pp. 1-7.
Greg Hewgill, "Copilot-The Windows PalmPilot Emulator," 1997, XP-002216884, pp. 1-3.

* cited by examiner

*Primary Examiner*—Abdullahi E. Salad
(74) *Attorney, Agent, or Firm*—Hickman Palermo Truong & Becker, LLP (57) ABSTRACT

A method and apparatus are disclosed for using one device to configure information to be displayed on another device with different display capabilities. Techniques are described for receiving input on a management device, which specifies information for display on a target device. The management device generates an image of how the specified information will appear when displayed on the target device. Additional input may be received on the management device that changes the information to be displayed or the format of the information. The management device modifies the image to reflect such changes. The management device may display an image of the target device that includes the display of the selected information. The management device may also emulate the target device, thereby permitting a user to simulate physical use of the target device by manipulating the image of the target device on the management device.

58 Claims, 7 Drawing Sheets

USING ONE DEVICE TO CONFIGURE AND EMULATE WEB SITE CONTENT TO BE DISPLAYED ON ANOTHER DEVICE

RELATED APPLICATION

This application claims domestic priority from prior U.S. provisional application Ser. No. 60/184,211 filed Feb. 22, 2000, the entire disclosure of which is hereby incorporated by reference as if fully set forth herein.

FIELD OF THE INVENTION

The present invention relates to providing services to clients and, more specifically, to using one device to configure and emulate web site content to be displayed on another device.

BACKGROUND OF THE INVENTION

The World Wide Web includes a network of servers on the Internet, each of which is associated with one or more HTML (Hypertext Markup Language) pages. The HTML pages associated with a server provide information and hypertext links to other documents on that and (usually) other servers. Servers communicate with clients by using the Hypertext Transfer Protocol (HTTP). The servers listen for requests from clients for their HTML pages, and are therefore often referred to as "listeners".

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

Traditionally, the information stored on listeners is in the form of static HTML pages. Static HTML pages are created and stored at the listener prior to a request from a web browser. In response to a request, a static HTML page is merely read from storage and transmitted to the requesting browser. Currently, there is a trend to develop listeners that respond to browser requests by performing dynamic operations. For example, a listener may respond to a request by issuing a query to a database, dynamically constructing a web page containing the results of the query, and transmitting the dynamically constructed HTML page to the requesting browser.

Another trend is to expand Internet access to devices other than conventional computer systems. For example, wireless phones have been developed that include embedded web browsers. Due to size and cost constraints, the "micro browsers" contained in these devices have very limited functionality relative to the browsers that have been developed for full-fledged computer systems. However, devices with embedded micro browsers are usable in circumstances under which using a conventional computer system is impractical.

The number of device types that are able to display web content, in one form or another, continues to increase. As the number of such web-enabled device types increases, so does the variation in the capabilities of the devices. For example, general purpose computer systems compensate for their immobility by providing large color screens, sophisticated sound output, significant processing power, ergonomic keyboard input, and an easy-to-use selection device such as a mouse, track ball, or track pad. Conversely, small mobile devices achieve their portability at the expense of screen size and user-input ease-of-use.

The World Wide Web contains far more content than can be displayed on any given device. Consequently, mechanisms have been provided that allow users of web-enabled devices to specify the content that they desire to see. Traditionally, the user of a web-enabled device uses the user-input mechanism of the web-enabled device to specify the content to be displayed on the web-enabled device. This practice works well when the web-enabled device is a general purpose computer system with sophisticated easy-to-use input mechanisms. Unfortunately, when the web-enabled device is a mobile phone with only a few buttons for receiving user input, the process of specifying content becomes awkward and tedious.

One approach to avoiding the tedious process of using the input mechanism of a mobile device to specify web content for the mobile device involves the use of a general purpose computer for specifying the sources, applications, or services to access from the mobile device. The interface presented to the computer for receiving the user input by which the user selects the desired content sources and applications may itself be presented in the form of one or more web pages.

While this approach eliminates the difficulty associated with using the user interface of the mobile device, it raises other problems. Specifically, the ultimate appearance of information on a mobile device is typically a major factor in deciding what should be displayed on a mobile device. If the decision of what to display on a mobile device is made without taking into account how that information will appear, the results may be completely unacceptable. For example, a user may specify that the news page sent to the mobile device include sound and photos. However, the sound and video capabilities of the device may be such that the sound played by the device is unintelligible, and the photos appear on the device as black boxes.

To ensure that the ultimate appearance of the information will be acceptable, a user may engage in the iterative process of (1) using the general purpose computer to specify the web content for the mobile device, (2) accessing the content from the mobile device, (3) based on the appearance of the content on the mobile device, using the general purpose computer to make adjustments to the web content for the mobile device, and (4) repeating steps (2) and (3) until the appearance of the selected web content on the mobile device is acceptable to the user.

Unfortunately, such an iterative process may be just as tedious as attempting to use the user interface of the mobile device to specify the web content. Further, the process becomes particularly laborious when a user must go through it for each of multiple mobile devices owned by the user.

Based on the foregoing, it is clearly desirable to provide improved techniques for specifying web content to be displayed on web-enabled devices that have relatively restrictive display and/or input mechanisms.

SUMMARY OF THE INVENTION

Techniques are provided for using a management device to configure information to be displayed on a target device that has different display capabilities than the management device. According to one aspect of the invention, a user specifies via the management device the information to be displayed on the target device. The management device displays an image of how that information would appear on the target device. For example, a user may use a general purpose computer to select via a web-based interface the information to be displayed on a mobile device. The computer displays an image of how the selected information would appear on the screen of the mobile device. The user may use the management device to change the information to be displayed on the mobile device, the format for displaying the specified information, or any combination thereof.

In another aspect, the management device may display an image of the target device, where the image portrays how the specified information will appear on the target device. The user via the management device may also manipulate the image of the target device to simulate the use of the physical target device, with the image emulating the behavior of the target device in response to the user's manipulations. For example, a computer may display an image of a mobile phone showing a list of local restaurants. The user may then use a mouse to click on the buttons of the phone on the image, such as to simulate pressing the up and down arrow keys on the physical phone. The image of the phone on the computer's display would then respond to the user's mouse clicks by scrolling the display on the screen of the phone image. The user may manipulate the information to be displayed on the phone by manipulating the contents of the display screen on the phone image on the computer.

Other aspects of the invention include, but are not limited to, the simultaneous display of how the user specified information will appear on more than one device, concurrently displaying multiple screen displays for a particular target device, or any combination thereof.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are described for using a first device to emulate the display of content on a second device that has different display capabilities than the first device, thereby allowing the ultimate appearance of the content of the second device to be considered while using the first device to specify the content for the second device. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Techniques are provided which allow users of one device to configure content to be delivered to a target device, where the mechanism that provides the interface for content selection also provides an image that emulates the target device, and displays how the selected content will appear on the target device.

Specifying a Set of Target Devices

According to one embodiment, a user with multiple devices uses one of the devices (hereinafter referred to as the "management device") to specify the content to be sent to one or more other devices. Both the management device and the other devices may be referred to as "web-enabled" devices, meaning that they are capable of sending and receiving information from the World Wide Web. While such information is typically in the form of HTML pages, the embodiments described herein are not limited to devices that exchange HTML pages. Pages in other formats may be exchanged, such as XML (extensible markup language) or WML (wireless markup language).

Furthermore, while the techniques described herein shall be described with reference to an embodiment in which the World Wide Web is the information source, the techniques described herein are applicable to any environment in which (1) a target device is able to display information from a source, and (2) a management device is able to specify the content or format of that information.

Due to the sophistication of the display and input mechanisms available for general-purpose computers, a general-purpose computer will typically be chosen to be the management device. However, the device selected to be the management device may vary from situation to situation, and this embodiment is not limited to the selection of any particular type of management device.

The user causes the management device to retrieve data from a web server. According to one embodiment, the data causes the browser of the management device to display user interface controls that allow the user to select a set of one or more "target" devices. The target devices are the web-enable devices to which a specified set of web content will be delivered, where the user uses the management device to select the specified set of web content.

Figure 1:
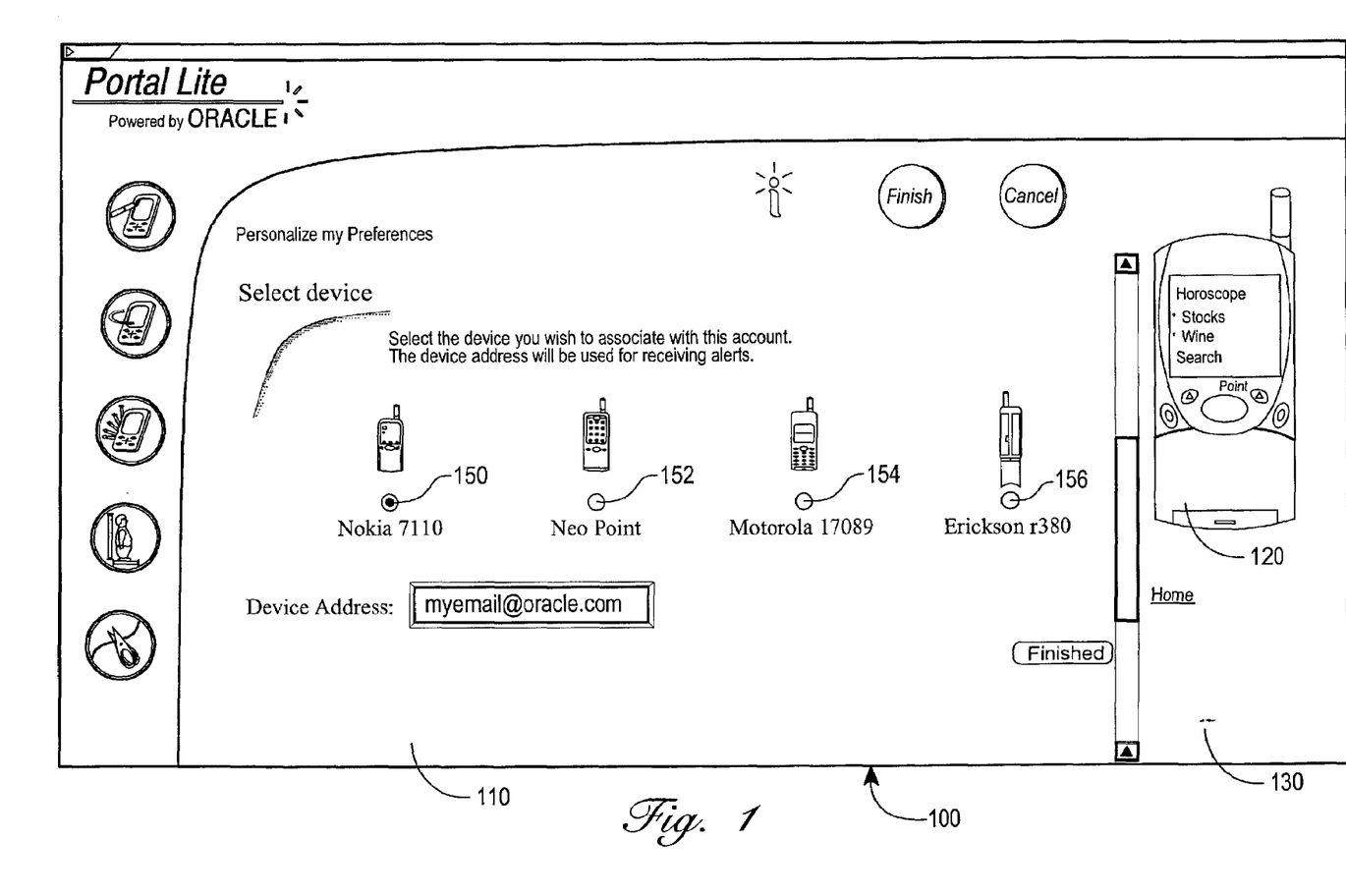
FIG. 1 is an illustration of a target device selection user interface that may be provided over the web and of a target device that is displayed in a frame of a web page, according to one embodiment of the invention.

FIG. 1 illustrates a "target device selection" user interface 110 that may be provided to the management device over the web, according to one embodiment. Selecting a target device using target device selection user interface 110 causes a visual depiction of the target device 120 to be displayed on the management device. FIG. 1 also illustrates an embodiment in which the visual depiction of the target device 120 is displayed in a frame 130 of a web page 100 that contains user interface 110 in another frame.

Figure 2:
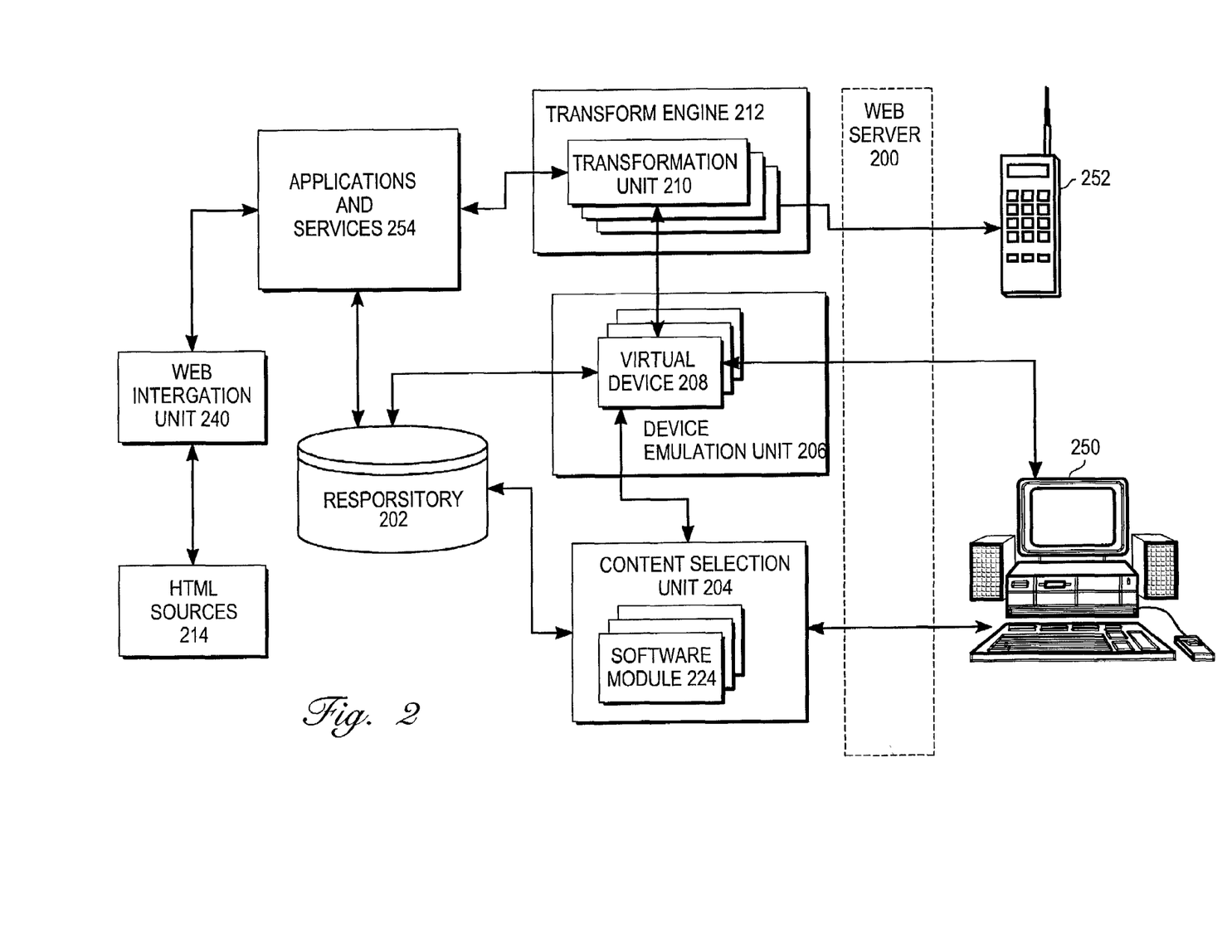
FIG. 2 is a block diagram that illustrates a high level overview of a system for using one device to configure and emulate web site content to be displayed on another device, according to one embodiment of the invention.

FIG. 2 illustrates a system configured according to one embodiment of the invention. The system includes a web server 200, a management device 250 and a target device 252. Web server 200 includes a content selection unit 204 and a device emulation unit 206 for loading one or more virtual devices 208, and a transformation engine 212 comprising one or more transformation units 210. Content selection unit 204 includes one or more software modules 224 configured to transmit web pages to management device 250. The transmitted web pages may include, for example, web page 100 illustrated in FIG. 1 that includes user interface controls 150, 152, 154, and 156 for the user to specify one or more target devices.

In response to the user selecting target devices, information that identifies the selected devices is sent back to web server 200. This information is stored in a profile for the user that made the selection, which resides with other user profiles in a repository 202 on a storage device accessible to web server 200. In addition to storing data that indicates the target device selection, content selection unit 204 sends a message to the device emulation unit 206 to cause virtual devices 208 to be loaded for the selected target devices. In the present example, it shall be assumed that a single target device was selected. Consequently, only virtual device 208 has been loaded by device emulation unit 206 for management device 250.

Virtual device 208 is a software component that is configured to receive data in a particular format, and to generate code that causes that data to be displayed on the management device in the same way as it would be displayed on the target device that corresponds to the virtual device. In the illustrated system, web server 200 receives the content from applications and services 254, which in turn receive it from a web integration unit 240 that ultimately receives the content from HTML sources 214. According to one embodiment, the output generated by the applications and services 254 is in XML (extensible markup language) format. Transformation engine 212 includes transformation units 210 for converting that XML data to the input format expected by other devices, including the virtual device 208. In the illustrated system, the management device 250 is a general-purpose computer that is executing a browser, so the code generated by virtual device 208 is HTML code that is incorporated into the web pages sent by web server 200 to management device 250.

The specific components of web server 200 will vary from implementation to implementation depending on a variety of factors including the format of the data generated by the applications and services 254, the format expected by virtual device 208, and the format expected by the management device 250. For example, applications and services 254 may generate HTML code, rather than XML. In addition, virtual device 208 may be configured to receive HTML input, XML input, or some other form of input such as WML (wireless markup language). If the input format required by virtual device 208 is different than the format in which the data is received by web server 200, then an appropriate transformation unit 210 must process the content before it is supplied to the virtual device 208.

When virtual device 208 is loaded, it requests data for its "home page". The data that constitutes the home page of the virtual device 208 is identified in the user profile of the user for which virtual device 208 was loaded. In the illustrated embodiment, virtual device 208 receives the data for the home page from transformation unit 210 that, in turn, receives the data from the applications and services 254. As virtual device 208 receives the data, virtual device 208 interprets the data and presents it in a fashion which, when decoded by the browser on management device 250, completely mimics the effect of similar XML being transformed into the markup for the corresponding target device, such as WML, and viewed on the target device.

Advantageously, the embodiments described allow a user to configure and emulate web content for a target device, such as a mobile phone, using a management device, such as a general purpose computer like a desktop or laptop personal computer. This advantage can be achieved regardless of the format of the original web content or the format necessary for input to the target device. And there is also no need for the user to repeatedly configure the information and check how it appears on the target device. Rather, the user can configure the information for the target device on the management device and review how it would appear on the emulated image of the target device on the management device.

Web Content Selection

Once a set of target devices has been selected, the user is presented with a user interface that allows the user to select web content for the target devices. According to one embodiment, a web content selection user interface is displayed in one frame of a web page, while an image of a target device is concurrently displayed in another frame of the web page. The image of the target device is not static. Rather, the image of the target device accurately depicts how the currently selected web content will appear when displayed on the actual target device. When the user manipulates the content selection user interface to change the content to be sent to the target device, the image of the target device is updated to reflect the change in specified content. Thus, the user can immediately take into account the ultimate appearance of selected content on the target device without even having the target device present during the content selection process.

Figure 3:
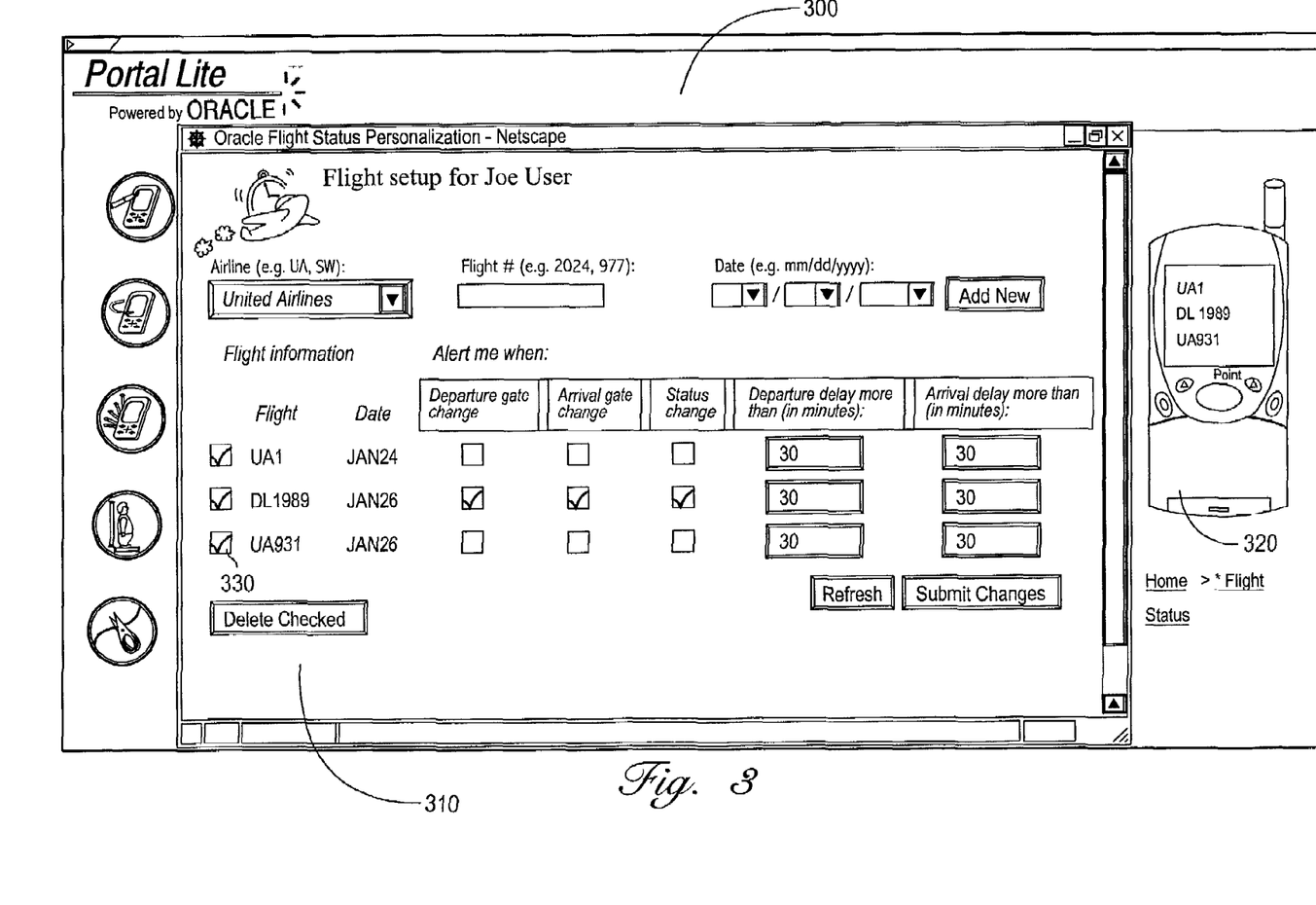
FIG. 3 is an illustration of an image of a target device that emulates how an actual target device would depict the web content that has been selected, according to one embodiment of the invention.

FIG. 3 shows how an image 320 of a target device emulates how the actual target device would depict the web content that has been selected using a dialog box 310 of a user interface, such as user interface 110 in FIG. 1. The initial appearance of the image is generated as described above. A user may change a web content selection, such as unchecking a checkmark or adding new information by checking a checkmark, such as an object 330 in dialog box 310 of the user interface.

Referring to FIG. 2, such a change is reflected in the user's configuration within repository 202, which describes the selection overlay chosen at any time by any user. Referring back to FIG. 3 and dialog box 310, as soon as the user presses a "Submit Changes" object 340, repository 202 is updated. Back in FIG. 2, virtual device 208 is notified to re-load the user web content. In response to the notification, virtual device 208 reads the revised user configuration information from repository 202, retrieves the corresponding content, and sends data to management device 250 that causes the display of image 320 in FIG. 3 of the target device in to be adjusted accordingly, creating the experience of instant simulation of the changes made.

Figure 4:
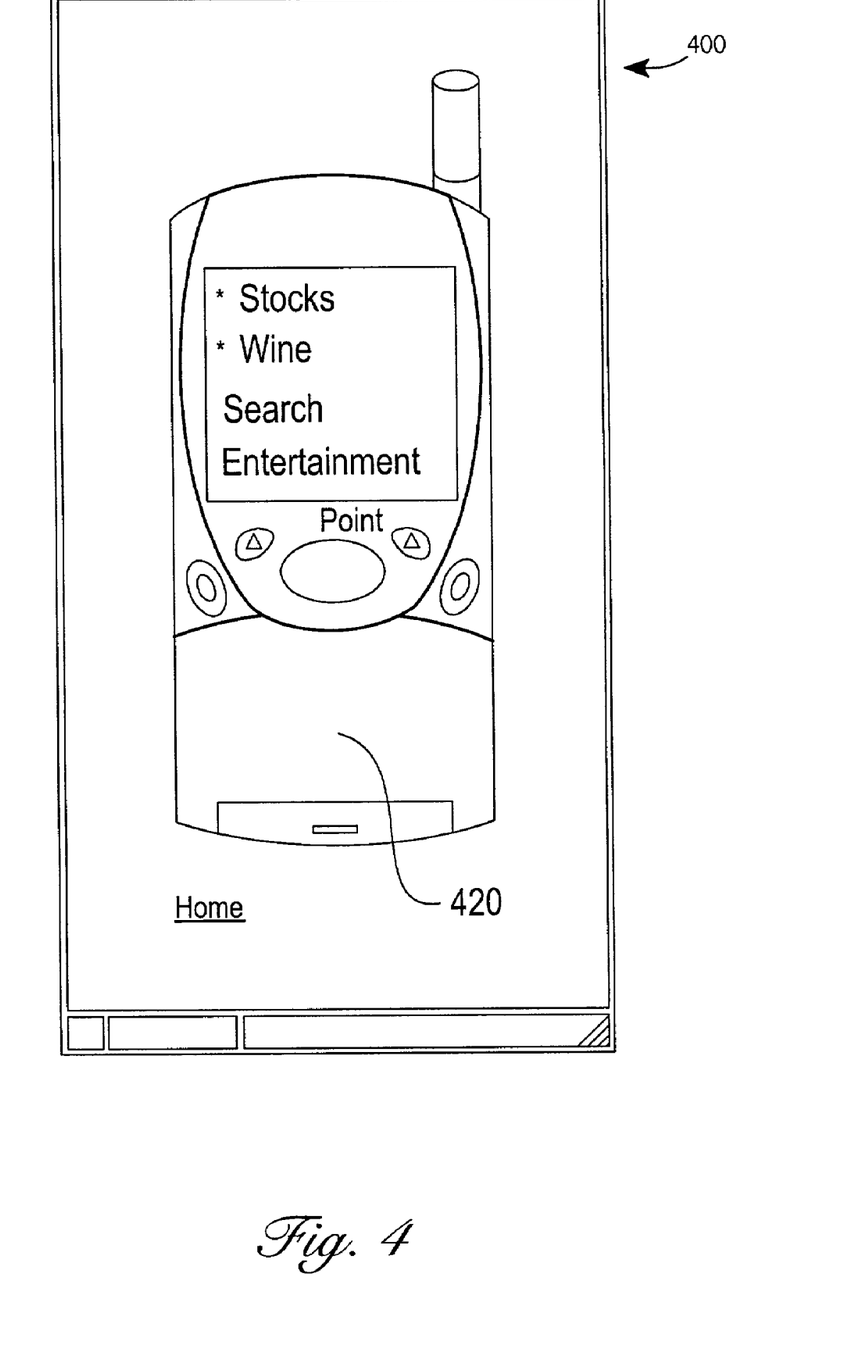
FIG. 4 is an illustration in which a target device is displayed in its own widow in a browser, according to one embodiment of the invention.

It will be appreciated that while the above examples illustrates the user interface in one frame of a web page and the image of the target device in another frame of a web page, the user interface and image of the target device can be in their own windows of an Internet browser. For example, FIG. 4 illustrates an image 420 of a target device in a window 400 that does not contain other features of the user interface.

Emulated Target Device Behavior

The web content specified for a target device may include more than a single static page of information. For example, the web content may include a series of pages that are linked in a hierarchical fashion. Each web-enabled device will typically have some mechanism for navigating through the web content that is sent to it. According to one embodiment, the image of a target device that is displayed on the managing device is implemented in such a way that manipulation of the controls depicted on the image has the same effect on the image as manipulation of the corresponding controls on the actual device would have on the actual device. This emulation of the actual device effectively creates a Virtual Device of the actual device on the managing device.

For example, the web uses very different user interface metaphors, such as clicking with mouse instead of pushing on buttons. The Virtual Device implements a close likeness of the physical device, by making the image of the physical device (such as a mobile phone) "dynamic." This means that the areas showing the phone buttons are sensitive to a mouse click. This way the user essentially uses the mouse as a virtual finger on the web to activate the mobile phone as in the physical world. The Virtual Device interprets these inputs as would the physical device, and responds with the same behavior in the image of the mobile phone in the display of the managing device. This allows the user to "use" the phone via the managing device to simulate how the phone will actually work in the physical world, without having to use the actual phone.

Format Manipulation

According to one embodiment, the image of a target device is implemented in a manner that allows the format of the selected web content to be altered by manipulating the display of the web content on the image of the target device. For example, a user may select a series of menu items to be displayed on the target device. In response to the selection, the visual image of the target device is updated to display how those menu items would appear on the target device. The format of the menu items on the displayed image is the same format that the menu items will have on the actual target device. The format of the content includes, for example, the order of the menu items, the font of the text, the size of the font, and (depending on the capabilities of the target device) the color of the text.

According to one embodiment, the image of the target device is implemented such that the user may affect the format of the web content that is to be sent to the target device by directly manipulating the display on the image of the target device. For example, the user may operate a mouse attached to the management device to "drag" one menu item from one position to another position on the display screen of the target device image. In response, the format of the web content that will be sent to the target device is changed such that when the content is displayed on the actual target device, the menu item will appear in the new position.

Figure 5:
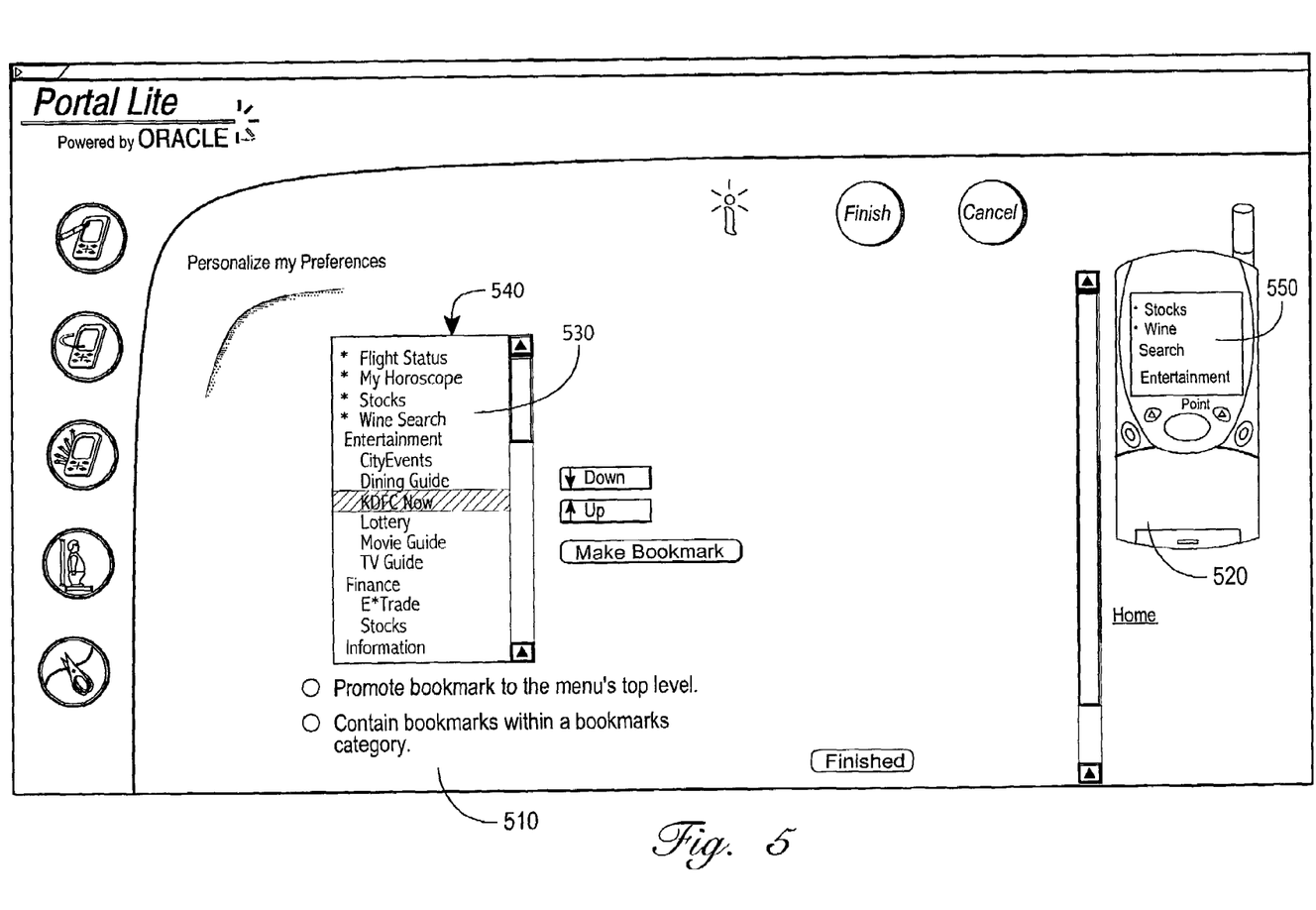
FIG. 5 is an illustration that shows how menus displayed in a control shown on a management device correspond to menus shown on the image of a target device, according to one embodiment of the invention.

To control the appearance of the information on the device, the interface on the management device has specific menus closely mimicking the target device. For example, FIG. 5 illustrates how a set of menus 530 displayed in a control 540 shown on a user interface 510 of the management device correspond to a set of menus 550 shown on an image 520 of the target device.

However, the functionality of the management device is not limited to the functionality of the target device. Consequently, the menu for selecting content includes more items than can be simultaneously shown on the target device, and the menu is able to take advantage of web-like user interface metaphors. For example, by clicking on a menu item in the user interface and manipulating user interface controls, a user can select an item and then change the order and appearance of that item. In response to the user input, the changes will be instantly reflected by the Virtual Device. As explained above, the instant change in the device image is achieved through updating configuration data in the repository, and causing the Virtual Device to request and interpret data based on the new configuration data.

Target Device Sets

As mentioned above, the user of the managing device is not limited to the selection of a single target device. Rather, the user may select multiple target devices. Using the managing device to change the web content specification, the user affects the web content that will be sent to every target device in the set. If the visual display of the managing device is large enough, the web content sent to the managing device may cause the managing device to concurrently display images of all of the target devices. The images would depict how the specified content will ultimately appear on the corresponding target devices. In situations in which there are large numbers of target devices, or where the display of the managing device is not sufficiently large, it may be desirable to display images of less than all of the target devices, and to provide user interface controls for selecting which target device images to display.

Multi-Screen Preview

The approach described herein provides the ability to manually navigate through the many layers of screen layouts on the Virtual Device exactly as a user would navigate through screens of the corresponding target device. However, such navigation may often require a great amount of key pressing. To alleviate this, the user can chose a multi-screen preview where a larger set of information is displayed in consecutive 'mini-screens', each of which mimics the look of different screen layer of the target device. Similarly, one or more unrelated screen displays of information for the target device can be shown in a multi-screen preview on the management device.

Figure 6:
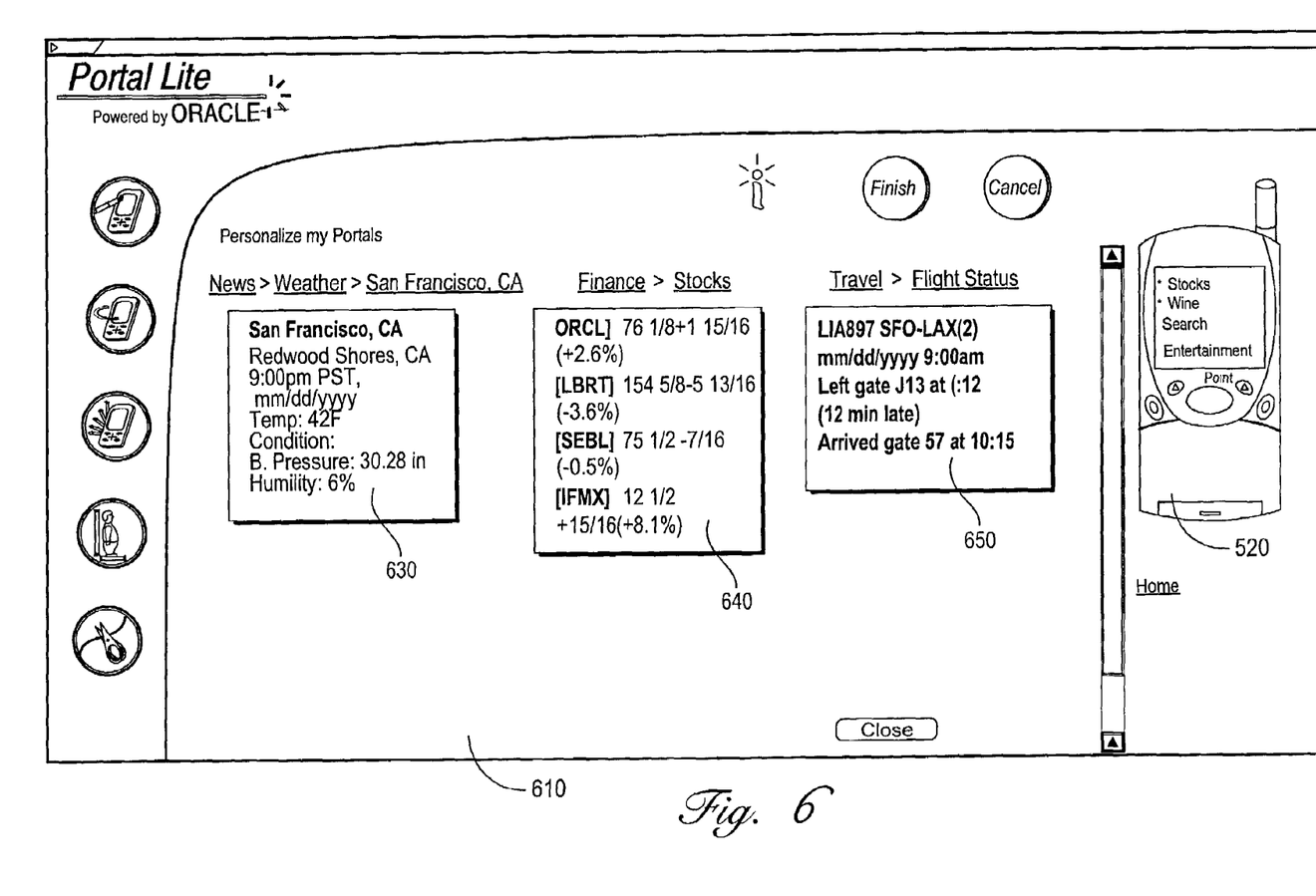
FIG. 6 is an illustration of a multi-screen preview, according to one embodiment of the invention.

FIG. 6 illustrates this feature. A user interface 610 displays mini-screens 630, 640, and 650, all of which show how the appearance of their respective content would appear on an image 620 of the target device and thus on the physical target device itself.

This is achieved by quickly passing all of the user's preferred content through the inner logic of the chosen Virtual Device(s), providing typical user input automatically, and recording the output. In the final stage, all of these outputs are collated in a preview screen for easy overview and validation of a larger set of services.

Fine-Granularity Selection of Web Content

According to one embodiment, a mechanism is provided for allowing users of one device, such as a general purpose computer, to specify, with fine granularity, the web content for another device, such as a mobile device. For example, using the mechanism, the owner of a mobile device may configure, using a general purpose computer, a user profile that determines the specific information that is sent to the mobile device. Thus, the user is not limited to specifying general sources of information (e.g. cable news network (CNN) or The Weather Channel), but may specify a subset of the content supplied by those sources (e.g. National Football League (NFL) scores, or the scores of a particular NFL team), thereby providing for finer granularity in the web content for the mobile device.

Various sources have allowed general-purpose computer users to achieve this level of customization, through user input entered at the computer, relative to the content delivered to their general-purpose computer. However, the techniques described herein allow general-purpose computer users to achieve this level of customization, through user input entered at the computer, relative to the content delivered to their mobile devices. Further, techniques are provided that allow users to use general-purpose computers to: 1) specify what information or which applications to download to a mobile device, and how the information or applications are customized for the specific user, and 2) enable the user to preview selected web content directly on web site before accessing the web content from the mobile device.

Hardware Overview

Figure 7:
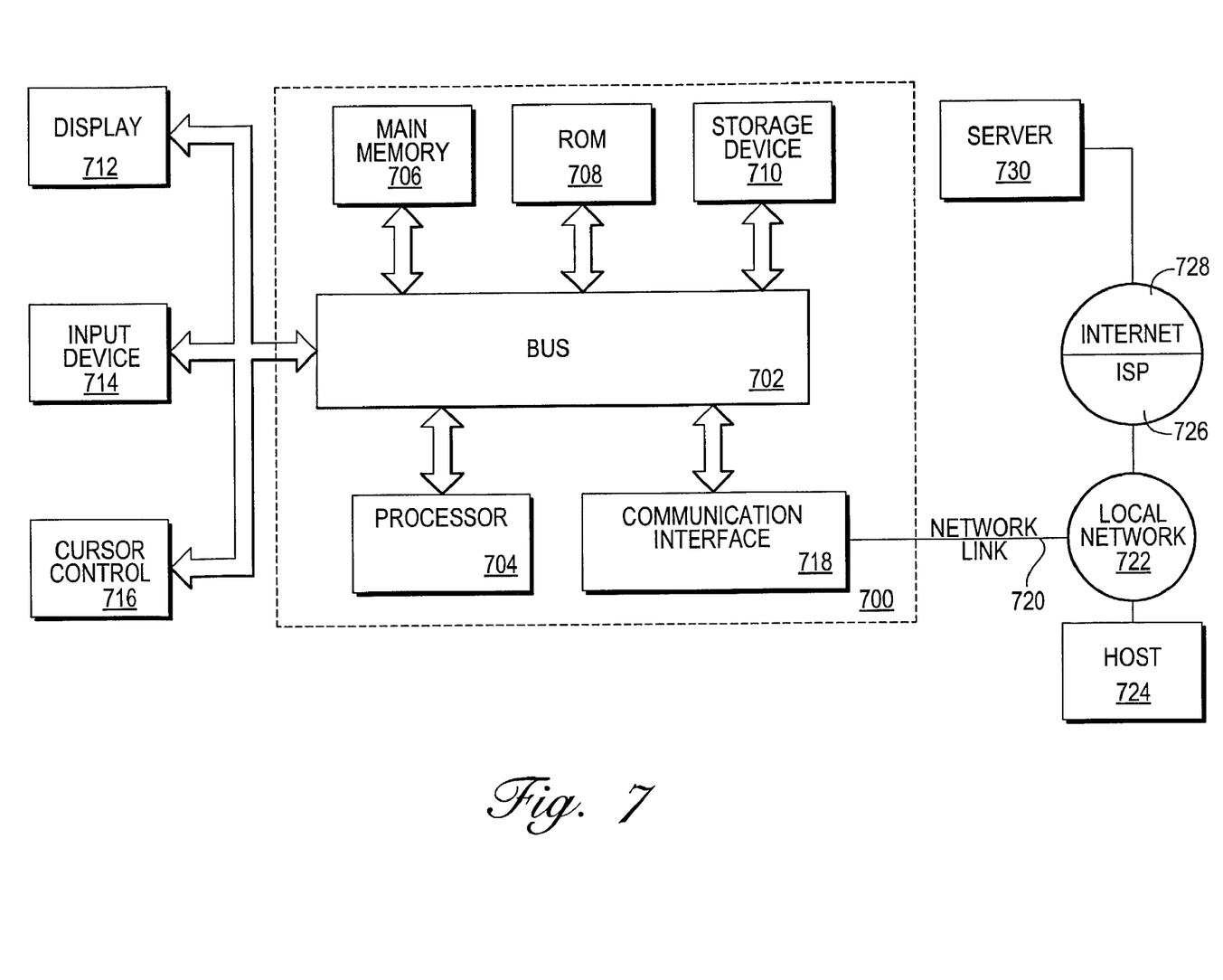
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are implemented by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application implements the techniques described herein.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of using a first device to configure information to be displayed on a second device that has different display capabilities than said first device, the method comprising the computer-implemented steps of:

receiving first input from said first device, wherein said first input specifies the information to be displayed on said second device;

causing said first device to generate a first visual depiction of how the information will appear when displayed on said second device;

based on said first input, storing data that specifies the information to be displayed on said second device;

based on said data, transmitting for display on said second device the information that said data specifies;

causing said first device to generate a second visual depiction, wherein said second visual depiction depicts said second device; and causing said first device to generate a third visual depiction, wherein said third visual depiction is a combination of said first visual depiction and said second visual depiction, such that said third visual depiction depicts said second device displaying the information.

2. The method as recited in claim 1, further comprising:

receiving second input from said first device, wherein said second input modifies the information to be displayed on said second device;

in response to said second input, causing said first device to generate a modified first visual depiction of how the information, as modified by said second input, will appear when displayed on said second device; and based on said second input, causing a change to the information displayed on said second device.

3. The method as recited in claim 1, further comprising:

receiving second input from said first device, wherein said second input specifies a format for displaying the information on said second device; and in response to said second input, causing said first device to generate, based on said format, a modified first visual depiction of how the information will appear when displayed on said second device.

4. The method as recited in claim 1, further comprising:

receiving second input from said first device, wherein said second input modifies how the information is to appear when displayed on said second device; and in response to said second input, causing said first device to generate a modified first visual depiction of how the information will appear, as modified by said second input, when displayed on said second device.

5. The method as recited in claim 1, further comprising:

causing said first device to generate a third visual depiction of how the information will appear when displayed on a third device, wherein said third device has different display capabilities than either said first device or said second device.

6. The method as recited in claim 5, wherein said first visual depiction and said third visual depiction are displayed concurrently on said first device.

7. The method as recited in claim 1, wherein the information specifies a first set of data to be displayed on said second device, further comprising:

receiving second input from said first device, wherein said second input specifies additional information that specifies a second set of data to be displayed on said second device, and wherein said first set of data and said second set of data are not displayed concurrently on said second device; and causing said first device to display concurrently both (a) said first visual depiction of how the information will appear when displayed on said second device and (b) a second visual depiction of how the additional information will appear when displayed on said second device.

8. The method as recited in claim 1, wherein said first device is a general purpose computer.

9. The method as recited in claim 1, wherein said second device is configured to communicate through a wireless connection.

10. The method as recited in claim 9, wherein said second device is a mobile phone.

11. The method as recited in claim 1, wherein said first input from said first device is received through a first frame of a window that depicts a web page and wherein said first visual depiction is displayed in a second frame of said window.

12. The method as recited in claim 1, wherein the information to be displayed on said second device is a particular portion of content available from a service.

13. The method as recited in claim 1, wherein the information to be displayed on said second device is an application available from a service.

14. A method of using a first device to configure information to be displayed on a second device that has different display capabilities than said first device, the method comprising the computer-implemented steps of:

receiving first input from said first device, wherein said first input specifies the information to be displayed on said second device;

causing said first device to generate a first visual depiction of how the information will appear when displayed on said second device;

based on said first input, storing data that specifies the information to be displayed on said second device;

based on said data, transmitting for display on said second device the information that said data specifies:

causing said first device to generate a second visual depiction, wherein said second visual depiction depicts said second device;

receiving data from said first device, wherein said data is generated in response to user interaction with said second visual depiction of said second device; and based on said data, causing said first device to visually emulate how said second device would operate in response to said user interaction.

15. A method of using a first device to configure information to be displayed on a second device that has different display capabilities than said first device, the method comprising the computer-implemented steps of:

receiving first input from said first device, wherein said first input specifies the information to be displayed on said second device;

causing said first device to generate a first visual depiction of how the information will appear when displayed on said second device;

based on said first input, storing data that specifies the information to be displayed on said second device;

based on said data, transmitting for display on said second device the information that said data specifies;

causing said first device to generate a second visual depiction, wherein said second visual depiction depicts said second device;

receiving data from said first device, wherein said data is generated in response to user interaction with said first visual depiction of the information; and based on said data, causing said first device to generate a modified first visual depiction of how the information will appear when displayed on said second device, as a result of said user interaction.

16. A method of using a general purpose computer to configure content to be displayed on a mobile device, the method comprising the computer-implemented steps of:

receiving first user input on said general purpose computer, wherein said first user input specifies the content to be displayed on said mobile device;

causing said general purpose computer to generate a first image of how the content will appear when displayed on said mobile device;

based on said first user input, storing data that specifies the content to be displayed on said mobile device;

based on said data, transmitting for display on said mobile device the content that said data specifies;

causing said general purpose computer to generate a second image, wherein said second image depicts said mobile; and wherein said first image of how the content will appear when displayed on said mobile device and said second image of said mobile device are combined to form a third image, wherein said third image depicts said mobile device displaying the content.

17. The method as recited in claim 16, further comprising:

receiving second user input on said general purpose computer, wherein said second user input modifies the content to be displayed on said mobile device;

in response to said second user input, causing said general purpose computer to generate a modified first image of how the content will appear when displayed on said mobile device, as modified by said second user input; and based on said second user input, causing a change to the content displayed on said mobile device.

18. The method as recited in claim 16, further comprising:

receiving additional data on said general purpose computer, wherein said additional data is generated in response to user interaction with said second image of the mobile device; and based on said additional data, emulating how said mobile device would operate in response to said user interaction.

19. The method as recited in claim 16, wherein the content specifies a first set of data to be displayed on said mobile device and further comprising:

receiving second user input on said general purpose computer, wherein said second user input specifies additional content that specifies a second set of data to be displayed on said mobile device, and wherein said first set of data and said second set of data are not displayed concurrently on said mobile device; and causing said general purpose computer to display concurrently both (a) said first image of how the content will appear when displayed on said mobile device and (b) a second image of how the additional content will appear when displayed on said mobile device.

20. A device of a first device type for specifying content for display on a second device of a second device type, the device comprising:

a user interface to specify the content to be displayed on said second device; and a display area that displays a first visual depiction of how the content will appear when displayed on said second device;

wherein the content that is displayed on the second device is based on first input received through said user interface;

wherein data is stored that specifies the information to be displayed on said second device;

wherein, based on said data, the information that said data specifies is transmitted for display on said second device;

wherein said display area is configured to display a second visual depiction, wherein said second visual depiction depicts said second device; and wherein said first visual depiction of how the content will appear when displayed on said second device and said second visual depiction of said second device are combined to form a third visual depiction, and wherein said third visual depiction depicts said second device displaying the information.

21. The device as recited in claim 20, wherein said user interface is configured to receive second input that modifies the content to be displayed on said second device;

wherein, in response to said second input, said display area is configured to display a modified first visual depiction of how the content, as modified by said second input, will appear when displayed on said second device; and based on said second input, causing a change to the content displayed on said second device.

22. The device as recited in claim 20, wherein said user interface is configured to receive second input that specifies a format for displaying the content on said second device, and wherein, in response to said second input, said display area is configured to display, based on said format, a modified first visual depiction of how the content will appear when displayed on said second device.

23. The device as recited in claim 20, wherein said user interface is configured to receive second input that modifies how the content is to appear when displayed on said second device, and wherein, in response to said second input, said display area is configured to display a modified first visual depiction of how the content will appear, as modified by said second input, when displayed on said second device.

24. The device as recited in claim 20, wherein the user interface is configured to send data to a third device, wherein said data specifies the content to be displayed on said second device, wherein said third device is configured to store said data, and wherein said third device is configured to transmit for display on said second device the content that said data specifies.

25. The device as recited in claim 20, wherein said display area is configured to display a third visual depiction of how the content will appear when displayed on a third device of a third device type.

26. The device as recited in claim 25, wherein said display area is configured to display concurrently said first visual depiction and said third visual depiction.

27. The device as recited in claim 20, wherein the content specifies a first set of data to be displayed on said second device, wherein said user interface is configured to receive input that specifies additional content, wherein the additional content specifies a second set of data to be displayed on said second device, and wherein said first set of data and said second set of data are not displayed concurrently on said second device, and wherein said display area is configured to display concurrently both (a) said first visual depiction of how the content will appear when displayed on said second device and (b) a second visual depiction of how the additional content will appear when displayed on said second device.

28. The device as recited in claim 20, wherein said device is a general purpose computer.

29. The device as recited in claim 20, wherein said second device is configured to communicate through a wireless connection.

30. The device as recited in claim 29, wherein said second device is a mobile phone.

31. The device as recited in claim 20, further comprising:
a window that depicts a web page, wherein said window is comprised of:
a first frame that is configured to receive user input and to send said user input to said user interface, and
a second frame that includes said display area that displays said first visual depiction of how the content will appear when displayed on said second device.

32. The device as recited in claim 20, wherein the content to be displayed on said second device is a particular portion of content available from a service.

33. The device as recited in claim 20, wherein the content to be displayed on said second device is an application available from a service.

34. A device of a first device type for specifying content for display on a second device of a second device type, the device comprising:

a user interface to specify the content to be displayed on said second device; and a display area that displays a first visual depiction of how the content will appear when displayed on said second device;

wherein the content that is displayed on the second device is based on first input received through said user interface;

wherein data is stored that specifies the information to be displayed on said second device;

wherein, based on said data, the information that said data specifies is transmitted for display on said second device;

wherein said display area is configured to display a second visual depiction, wherein said second visual depiction depicts said second device;

wherein said user interface is configured to receive data generated in response to user interactions with said second visual depiction of the information, and wherein said display area is configured to visually emulate how said second device would operate in response to said user interaction.

35. A device of a first device type for specifying content for display on a second device of a second device type, the device comprising:

a user interface to specify the content to be displayed on said second device; and a display area that displays a first visual depiction of how the content will appear when displayed on said second device;

wherein the content that is displayed on the second device is based on first input received through said user interface;

wherein data is stored that specifies the information to be displayed on said second device;

wherein, based on said data, the information that said data specifies is transmitted for display on said second device;

wherein said display area is configured to display a second visual depiction, wherein said second visual depiction depicts said second device;

wherein said user interface is configured to receive data generated in response to user interactions with said first visual depiction of said second device, and wherein said display area is configured to display a modified first visual depiction of how the content will appear when displayed on said second device, as a result of said user interaction.

36. A general purpose computer for specifying content for display on a mobile device, the general purpose computer comprising:

a user interface configured to receive first user input that specifies the content to be displayed on said mobile device, a display area that displays a first image of how the content will appear when displayed on said mobile device, wherein the content that is displayed on the mobile device is based on said first user input received through said user interface;

wherein data is stored that specifies the content to be displayed on said mobile device;

wherein, based on said data, the content that said data specifies is transmitted for display on said mobile device;

wherein said display area is configured to display a second image, wherein said second image depicts said mobile device; and wherein said first image of how the content will appear when displayed on said mobile device and said second image of said mobile device are combined to form a third image, wherein said third image depicts said mobile device displaying the content.

37. The device as recited in claim 36, wherein said user interface is configured to receive second user input that modifies the content to be displayed on said mobile device;

wherein, in response to said second user input, said display area is configured to display a modified first image of how the content will appear when displayed on said mobile device, as modified by said second user input; and wherein, based on said second user input, said display area is configured to display a change to the content that is displayed on said mobile device.

38. The device as recited in claim 36, wherein said user interface is configured to receive additional data that is generated in response to user interaction with said second image of the mobile device; and said display area is configured to, based on said additional data, emulate how said mobile device would operate in response to said user interaction.

39. The device as recited in claim 36, wherein the content specifies a first set of data to be displayed on said mobile device;

wherein said user interface is configured to receive second user input that specifies additional content that specifies a second set of data to be displayed on said mobile device;

wherein said first set of data and said second set of data are not displayed concurrently on said mobile device; and wherein said display area is configured to display concurrently both (a) said first image of how the content will appear when displayed on said mobile device and (b) a second image of how the additional content will appear when displayed on said mobile device.

40. A computer-readable medium carrying one or more sequences of instructions for using a first device to configure information to be displayed on a second device that has different display capabilities than said first device, which instructions, when executed by one or more processors, cause the one or more processors to carry out the steps of:

receiving first input from said first device, wherein said first input specifies the information to be displayed on said second device;

causing said first device to generate a first visual depiction of how the information will appear when displayed on said second device;

based on said first input, storing data that specifies the information to be displayed on said second device;

based on said data, transmitting for display on said second device the information that said data specifies;

causing said first device to generate a second visual depiction, wherein said second visual depiction depicts said second device; and causing said first device to generate a third visual depiction, wherein said third visual depiction is a combination of said first visual depiction and said second visual depiction, such that said third visual depiction depicts said second device displaying the information.

41. The computer-readable medium as recited in claim 40, further comprising instructions which, when executed by the one or more processors, cause the one or more processors to carry out the steps of:

receiving second input from said first device, wherein said second input modifies the information to be displayed on said second device;

in response to said second input, causing said first device to generate a modified first visual depiction of how the information, as modified by said second input, will appear when displayed on said second device; and based on said second input, causing a change to the information displayed on said second device.

42. The computer-readable medium as recited in claim 40, further comprising instructions which, when executed by the one or more processors, cause the one or more processors-to carry out the steps of:

receiving second input from said first device, wherein said second input specifies a format for displaying the information on said second device; and in response to said second input, causing said first device to generate, based on said format, a modified first visual depiction of how the information will appear when displayed on said second device.

43. The computer-readable medium as recited in claim 40, further comprising instructions which, when executed by the one or more processors, cause the one or more processors to carry out the steps of:

receiving second input from said first device, wherein said second input modifies how the information is to appear when displayed on said second device; and in response to said second input, causing said first device to generate a modified first visual depiction of how the information will appear, as modified by said second input, when displayed on said second device.

44. The computer-readable medium as recited in claim 40, wherein the information specifies a first set of data to be displayed on said second device and further comprising instructions which, when executed by the one or more processors, cause the one or more processors to carry out the steps of:

receiving second input from said first device, wherein said second input specifies additional information that specifies a second set of data to be displayed on said second device, and wherein said first set of data and said second set of data are not displayed concurrently on said second device; and causing said first device to display concurrently both (a) said first visual depiction of how the information will appear when displayed on said second device and (b) a second visual depiction of how the additional information will appear when displayed on said second device.

45. The computer-readable medium as recited in claim 40, wherein said first device is a general purpose computer.

46. The computer-readable medium as recited in claim 40, wherein said second device is configured to communicate through a wireless connection.

47. The computer-readable medium as recited in claim 46, wherein said second device is a mobile phone.

48. The computer-readable medium as recited in claim 40, wherein said first input from said first device is received through a first frame of a window that depicts a web page and wherein said first visual depiction is displayed in a second frame of said window.

49. The computer-readable medium as recited in claim 40, wherein the information to be displayed on said second device is a particular portion of content available from a service.

50. The computer-readable medium as recited in claim 40, wherein the information to be displayed on said second device is an application available from a service.

51. A computer-readable medium carrying one or more sequences of instructions for using a first device to configure information to be displayed on a second device that has different display capabilities than said first device, which instructions, when executed by one or more processors, cause the one or more processors to carry out the steps of:

receiving first input from said first device, wherein said first input specifies the information to be displayed on said second device;

causing said first device to generate a first visual depiction of how the information will appear when displayed on said second device;

based on said first input, storing data that specifies the information to be displayed on said second device;

based on said data, transmitting for display on said second device the information that said data specifies;

causing said first device to generate a second visual depiction, wherein said second visual depiction depicts said second device;

receiving data from said first device, wherein said data is generated in response to user interaction with said second visual depiction of said second device; and based on said data, causing said first device to visually emulate how said second device would operate in response to said user interaction.

52. A computer-readable medium carrying one or more sequences of instructions for using a first device to configure information to be displayed on a second device that has different display capabilities than said first device, which instructions, when executed by one or more processors, cause the one or more processors to carry out the steps of:

receiving first input from said first device, wherein said first input specifies the information to be displayed on said second device;

causing said first device to generate a first visual depiction of how the information will appear when displayed on said second device;

based on said first input, storing data that specifies the information to be displayed on said second device;

based on said data, transmitting for display on said second device the information that said data specifies;

causing said first device to generate a second visual depiction, wherein said second visual depiction depicts said second device;

receiving data from said first device, wherein said data is generated in response to user interaction with said first visual depiction of the information; and based on said data, causing said first device to generate a modified first visual depiction of how the information will appear when displayed on said second device, as a result of said user interaction.

53. The computer-readable medium as recited in claim 40, further comprising instructions which, when executed by the one or more processors, cause the one or more processors to carry out the step of:

causing said first device to generate a third visual depiction of how the information will appear when displayed on a third device, wherein said third device has different display capabilities than either said first device or said second device.

54. The computer-readable medium as recited in claim 53, wherein said first visual depiction and said third visual depiction are displayed concurrently on said first device.

55. A computer-readable medium carrying one or more sequences of instructions for using a general purpose computer to configure content to be displayed on a mobile device, which instructions, when executed by one or more processors, cause the one or more processors to carry out the steps of:

receiving first user input on said general purpose computer, wherein said first user input specifies the content to be displayed on said mobile device;

causing said general purpose computer to generate a first image of how the content will appear when displayed on said mobile device;

based on said first user input, storing data that specifies the content to be displayed or said mobile device;

based on said data, transmitting for display on said mobile device the content that said data specifies;

causing said general purpose computer to generate a second image, wherein said second image depicts said mobile device; and wherein said first image of how the content will appear when displayed on said mobile device and said second image of said mobile device are combined to form a third image, wherein said third image depicts said mobile device displaying the content.

56. The computer-readable medium as recited in claim 55, further comprising instructions which, when executed by the one or more processors, cause the one or more processors to carry out the steps of:

receiving second user input on said general purpose computer, wherein said second user input modifies the content to be displayed on said mobile device;

in response to said second user input, causing said general purpose computer to generate a modified first image of how the content will appear when displayed on said mobile device, as modified by said second user input; and based on said second user input, causing a change to the content displayed on said mobile device.

57. The computer-readable medium as recited in claim 56, further comprising instructions which, when executed by the one or more processors, cause the one or more processors to carry out the step of:

receiving additional data on said general purpose computer, wherein said additional data is generated in response to user interaction with said second image of the mobile device; and based on said additional data, emulating how said mobile device would operate in response to said user interaction.

58. The computer-readable medium as recited in claim 56, wherein the content specifies a first set of data to be displayed on said mobile device and further comprising instructions which, when executed by the one or more processors, cause the one or more processors to carry out the step of:

receiving second user input on said general purpose computer, wherein said second user input specifies additional content that specifies a second set of data to be displayed on said mobile device, and wherein said first set of data and said second set of data are not displayed concurrently on said mobile device; and causing the general purpose computer to display concurrently both (a) said first image of how the content will appear when displayed on said mobile device and (b) a second image of how the additional content will appear when displayed on said mobile device.

* * * * *

UNITED STATES PATENT AND TRADEMARK OFFICE
CERTIFICATE OF CORRECTION

PATENT NO. : 6,993,575 B2
DATED : January 31, 2006
INVENTOR(S) : David Abkowitz et al.

It is certified that error appears in the above-identified patent and that said Letters Patent is hereby corrected as shown below:

Column 18,
Line 17, delete "processors-to" and insert -- processors to --.

Column 20,
Lines 47 and 58, delete "claim 56" and insert -- claim 55 --.

Signed and Sealed this

Fourth Day of April, 2006

JON W. DUDAS
*Director of the United States Patent and Trademark Office*